US008983761B2

(12) United States Patent
Smith et al.

(10) Patent No.: US 8,983,761 B2
(45) Date of Patent: Mar. 17, 2015

(54) AUDIO MONITOR AND EVENT-CONFLICT SIGNALING SYSTEM

(71) Applicant: The MITRE Corporation, McLean, VA (US)

(72) Inventors: Elida C. Smith, Reston, VA (US); Herbert T. King, Alexandria, VA (US); Robert M. Tarakan, McLean, VA (US); Hunter Kopald, Arlington, VA (US); Shuo Chen, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 14/148,321

(22) Filed: Jan. 6, 2014

(65) Prior Publication Data

US 2014/0195139 A1 Jul. 10, 2014

Related U.S. Application Data

(60) Provisional application No. 61/750,163, filed on Jan. 9, 2013.

(51) Int. Cl.
*G06F 19/00* (2011.01)
*G08G 5/00* (2006.01)

(52) U.S. Cl.
CPC ............ *G08G 5/0026* (2013.01); *G08G 5/0013* (2013.01); *G08G 5/0065* (2013.01)
USPC ........................................................ 701/120

(58) Field of Classification Search
None
See application file for complete search history.

(56) References Cited

U.S. PATENT DOCUMENTS

| | | | | |
|---|---|---|---|---|
| 7,796,055 | B2 * | 9/2010 | Clark et al. | 340/972 |
| 8,126,600 | B2 * | 2/2012 | Conner et al. | 701/16 |
| 2004/0225440 | A1 * | 11/2004 | Khatwa et al. | 701/301 |
| 2010/0274468 | A1 * | 10/2010 | Durham et al. | 701/120 |
| 2014/0127655 | A1 * | 5/2014 | Taylor et al. | 434/220 |

* cited by examiner

*Primary Examiner* — Thomas Tarcza
*Assistant Examiner* — Adam Alharbi
(74) *Attorney, Agent, or Firm* — Sterne, Kessler, Goldstein & Fox P.L.L.C.

(57) ABSTRACT

Disclosed herein are system, method, and computer program product embodiments for an audio monitoring and event-conflict signaling system. An embodiment operates by receiving airport audio communication originating from an airport control tower (ATCT) of an airport with one or more runways or a flight deck of an aircraft. The system determines one or more keywords corresponding to a runway event affecting operations of a particular runway of the airport. The system detects, within the airport audio communication, a conflict comprising a correspondence between the airport audio communication and one or more of the keywords, and notifies the ACT of the conflict.

21 Claims, 4 Drawing Sheets

AUDIO MONITOR AND EVENT-CONFLICT SIGNALING SYSTEM

CROSS-REFERENCE TO RELATED APPLICATIONS

This utility patent application claims priority from provisional U.S. Patent Application Ser. No. 61/750,163, filed Jan. 9, 2013, which is herein incorporated by reference in its entirety.

BACKGROUND

Air traffic controllers (referred to herein, interchangeably as “controllers” or “tower controllers”) in an Air Traffic Control Tower (ATCT) are responsible for managing the operation of runways at airports. Controllers check the status of runways and clear aircraft and other vehicles to use the runway. Controllers rely on visual checks to determine whether a runway is operational/free/in-use, before clearing an aircraft to use the runway. For example, when a runway is closed for an extended period of time, airport maintenance personnel will often physically place visual indicators, such as barrels or other warning signs on the runway to alert control tower personnel not to clear any aircraft to use the runway. However, for some runway closures, such as short-term closures, maintenance personnel will not place visual indicators on the runway, in which case the controllers must rely on their memory (if it was even communicated to them that a runway is closed) to determine whether or not a runway is open or closed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
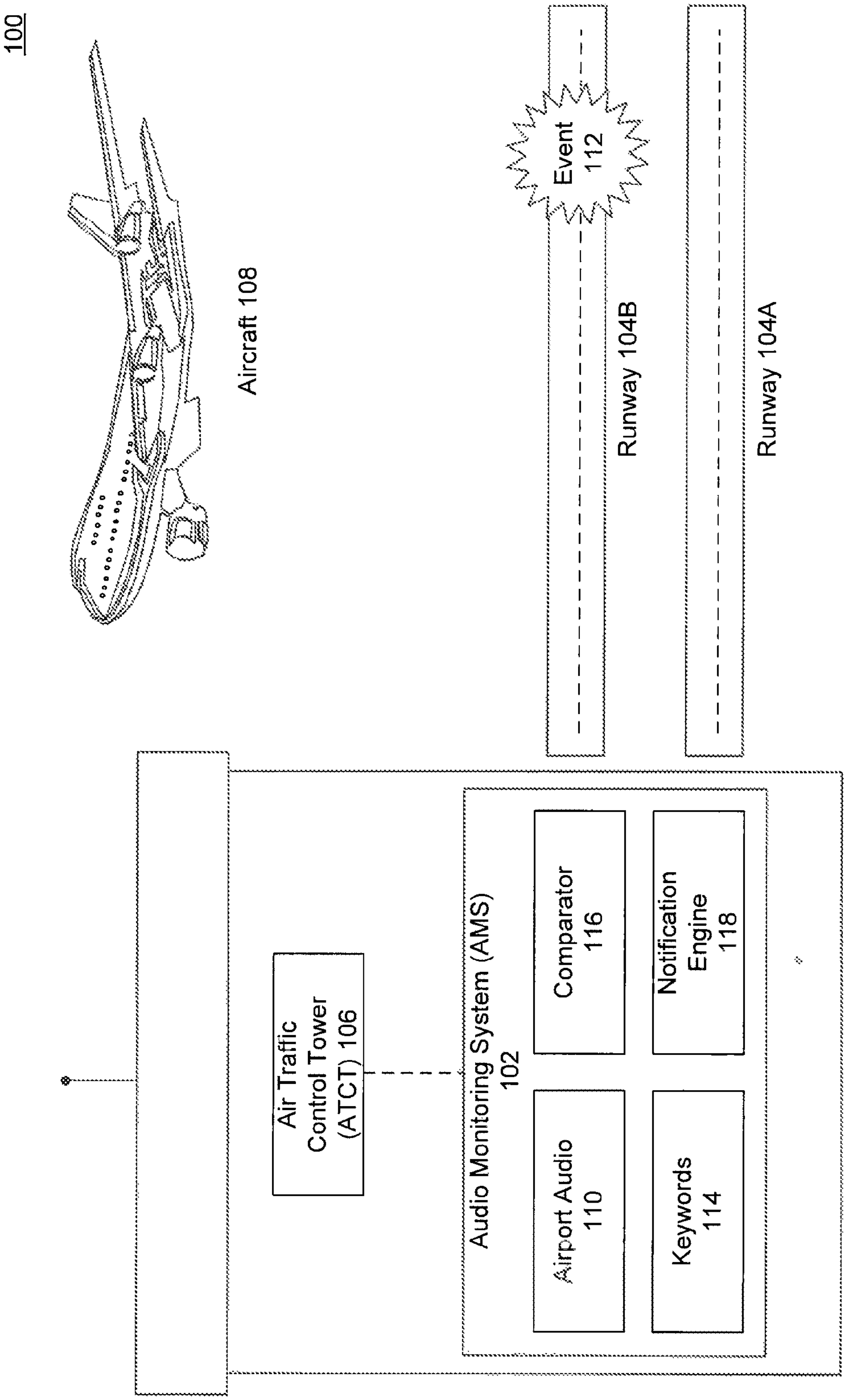
FIG. 1 is a block diagram of a system that monitors audio for event-conflicts and signals when an event-conflict is detected, according to an example embodiment.

Provided herein are system, method and/or computer program product embodiments, and/or combinations and sub-combinations thereof, for monitoring audio for event-conflicts and signaling when an event-conflict is detected.

Controllers are responsible for managing operational use of runways at airports and maintaining the appropriate separation between aircraft operating on those runways. To manage the operational use of runways and maintain traffic separation, controllers routinely check the status of runways, and the status of airport traffic (e.g., position) and their intent (e.g., whether a flight is landing or taking off). Controllers also often rely on visual checks (e.g. by looking out the ATCT window) to see whether a runway is operational/free/in-use, before clearing an aircraft to use the runway. Based on this set of information gathered, the controller clears (i.e., authorizes) aircraft (or other vehicles) to use the runway.

A specific part of the controller’s responsibility is to prevent runway incursions, which are events that occur when either the separation between two aircraft or more is violated (e.g., taxi of an aircraft across the runway with an active departing aircraft), or when a runway with closed status is improperly used for either a departure or arrival operation. Separation-based runway incursions occur when arriving aircraft, departing aircraft, and taxiing aircraft or other vehicles operate in too close a proximity (time or distance) to one another. Operational use-based runway incursions occur when a closed runway is improperly being used for the arrival or departure of aircraft.

Runways can be closed for a variety of reasons, and such closures may be either short-term (e.g., several minutes or hours) or long-term (e.g., several days or weeks). For example, runways closures may be due to runway maintenance such as snow or foreign object/debris removal, measurements of surface friction, repair of runway infrastructure (e.g., instrument landing system, runway lighting), construction, or any other reason (such as to allow for overflow parking of aircraft).

When a runway is closed, air traffic controllers primarily use physical memory aids such as flight strip placards to remind them of a closed runway status so they don’t clear pilots to operate on the closed runway. In the case of long-term runway closures, airport maintenance personnel may physically place visual indicators, such as barrels or other warning signs on the closed runway to alert controllers and pilots of aircraft not to use the runway; however, these visual indicators might not be readily visible to the controller and/or pilot (in conditions of low weather/cloud ceilings or night-time operations). For some runway closures, such as short-term closures, maintenance personnel will not place any visual indicators on the runway, in which case the controllers are required to rely on their memory to determine whether or not a runway is open or closed.

Separation-based runway incursion events are when more than one operation occurs on an ‘active runway’. One example is when a flight arrives to the same runway on which a departing flight is holding in position or is still otherwise conducting its departure/takeoff from that runway. Another example is when a flight taxis across the same runway that is being used at or about the time an arriving or departing flight is using the runway.

At some airports, some surveillance-based automation (SBA) is available in the ATCT. For example, the SBA may provide information about the location and speed of traffic and vehicles. Though this information may aid controllers in detecting runway incursion events, because of the close proximity and varied nature of operations at an airport, the SBA is not always able to predict events far enough in advance in order to prevent them from occurring.

Controller-to-pilot voice communications are a critical component of air traffic management and contain a rich set of information. Today operational intent information (e.g., aircraft A plans to land on runway B) is derived at least partially by air traffic controllers in a manual fashion through traditional voice/audio communication exchanges with the pilots on the flight deck of aircraft. The success, however, of relying solely on audio communication between the controller and pilots relies heavily on the controller’s working memory to accurately remember and recall that information.

The automated derivation of operational intent information based on system processing of controller and pilot audio communications can mitigate the high dependence on the controller's working memory for a variety of needs. Specifically, for maintaining safe separation and use of runways, the automated derivation of operational intent information based on system processing of controller and pilot audio communications can be used to provide early notice/warning to controllers of predicted or anticipated runway incursion events (both separation-based and operational use-based runway incursion events). This allows for early resolution of runway incursions through actions initiated by pilots and controllers, and avoidance of some such runway incursions altogether.

FIG. 1 is a block diagram 100 of a system that monitors audio for runway incursion event-conflicts and signals when an event-conflict is detected, according to an example embodiment. The systems described herein are provided in the context of airport operations, but one skilled in the art will understand that the description may be applied to other contexts as well, such as other shipping or transportation ports of entry and/or exit.

An airport monitoring system (AMS) 102 tracks when airport runways 104 are open/closed, and signals or notifies an Air Traffic Control Tower (ATCT) 106 when potential runway conflicts are detected. (It is noted that references herein to ATCT 106 may refer to personnel in an airport control tower, rather than the ATCT itself.) For example, AMS 102 may monitor airport audio 110 to determine if an aircraft 108 has been cleared to use a closed runway 104B, and notify or signal ATCT 106 of the conflict or potential incursion with an event 112 (e.g., the closure of runway 104B).

ATCT 106 is an example air traffic control tower that may have one or more tower controllers or other personnel who are monitoring and/or managing airport traffic. For example, tower controllers may clear aircraft 108 to land and/or takeoff from runways 104 of an airport. In an embodiment, a tower controller visually monitors runways 104 to determine the runway status, (e.g., whether runways 104 are operational, open, closed, or in-use). If runway 104 is closed, the controller will use a memory aid, such as a flight strip placard, as a reminder that the runway is closed. If runway 104 is closed for an extended period of time, airport maintenance personnel will often place visual indicators on the closed runway 104 to indicate that the closed runway 104 should not be used. Such visual indicators may include construction barrels, warning signs, lights, or other indicators. Upon seeing the visual indicators, a tower controller will know not to use, or not to clear aircraft 108 to use a particular runway 104 because it is closed.

However, the tower controllers may not see the visual indicators or airport maintenance personnel may not place visual indicators on runways 104 for all runway 104 closures, particularly for shorter-term closures. These shorter-term closures, for which no visual indicators are generally placed on runways 104, are referred to herein as events 112. When such a closure occurs, maintenance personnel may notify ATCT 106 of event 112 on runway 104B. It is then often up to tower controllers to remember that runway 104B is closed due to event 112. Event 112 may be any event that causes a temporary closure of runway 104B, including but not limited to, plowing, deicing, maintenance, or other emergency situations. Controllers typically use memory aids, such as flight strip placards, to help them remember that a runway is closed.

If tower controllers are required to rely on their memory, there may be occurrences when they forget the status of a particular airport runway 104 and clear aircraft 108 to land on/takeoff from a closed runway 104B. When such occurrences happen, additional risk is often introduced to the operation of aircraft 108. For example, if aircraft 108 is cleared to land on closed runway 104B, the pilot, upon determining that runway 104B is closed, may be forced to perform an evasive maneuver to avoid using closed runway 104B, such as ago-around (or missed landing), etc. The accidental clearing of an aircraft to use a closed runway 104B creates a potentially dangerous situation. AMS 102 helps to avoid such occurrences by notifying ATCT 106 when an aircraft has been cleared to use a closed runway 104B.

AMS 102 may track or receive a notification of events 112 (e.g., when runways 104 are open/closed) and monitor airport audio 110 for audio indications that an ATC or other ATCT 106 personnel may be clearing or may have cleared aircraft 108 to use a closed runway 104B, or runway 104B with event 112.

In an embodiment, AMS 02 may receive an indication that runway 104B is closed due to event 112 from input by airport maintenance, ATCT 106, from communication with another airport system, or from monitoring airport audio 110.

Event 112 may be a close-ended or open-ended runway closure. For example, AMS 102 may receive an indication of event 112 with a time interval, such as runway 104B is closed for forty-five minutes, or until 12:30 pm. Or for example, AMS 102 may receive an indication that runway 104B is closed due to an event 112, but no specified closure duration may be specified. If no closure duration is specified, AMS 102 may track runway 104B as being closed until a runway opening indication is received, or may have a default re-open time, such as four hours. At the expiration of any default closure or closed-ended event time, AMS 102 may query airport personnel as to the status of runway 104B to confirm whether event 112 is still ongoing.

AMS 102 may correspond, generate, or otherwise associate keywords 114 with runway events 112. Keywords 114 may include any words that are commonly associated with events 112, and may include words or phrases that indicate that an event 112 has occurred, has completed, or is in duration. Keywords 114 may also include words or phrases that indicate that a conflict or potential conflict is occurring (e.g., a tower controller has cleared aircraft 108 to use a closed runway 104B). Keywords 114 may also include colloquialisms, abbreviations, or other shorthand commonly used by tower controllers or other airport personnel in communicating with one another or with the flight decks of aircraft 108. Keywords 114 may also include a list of runway 104 identifiers or names, which may vary by airport.

AMS 102 may monitor airport audio 110 for keywords 114. Airport audio 110 may include any communications between ATCT 106 and another entity, or between tower controllers working within ATCT 106. For example, AMS 102 may monitor airport audio 110 to determine if an event 112 has occurred and/or on which runway 104 event 112 has occurred. AMS 102 may also monitor airport audio 110 to determine if a tower controller has cleared any aircraft 108 to use (e.g., land/takeoff) a closed runway 104B (e.g., a runway 104 with an ongoing event 112).

A comparator 116 may compare airport audio 110 against keywords 114 to determine if a conflict has occurred. Comparator 116 may be a listening device that is able to translate/understand sounds, such as voice. Comparator 116 may monitor airport audio 110 for keywords 114, and based on the detection of one or more keywords 114, may identify or detect when conflicts with event 112 have occurred. For example, if AMS 102 receives an indication that "Runway three zero" is closed, comparator 116 may listen to airport audio 110 for keywords which may include any combination of "runway," "thirty," "three," "zero," "cleared," "land," "takeoff." Comparator 116 may detect a conflict if one or more, of keywords 114, or specified combinations thereof, are detected in airport audio 110.

In an embodiment, for a conflict to be detected by comparator 116, a specified combination of keywords 114 may need to be detected within a particular word span, time span or order. For example, comparator 116 may listen to airport audio 110 for the combination of "runway" and "thirty" or "three" or "zero" within ten words of each other or within 2 seconds. Then for example, if "runway three zero" is detected, the keywords "open," "closed," "cleared," "takeoff," "land," may be detected. From various combinations of keywords 114, as listened for by the operational algorithms of comparator 116, comparator 116 may detect when potential conflicts (e.g., a tower controller clearing aircraft 108 to land/takeoff on a closed runway 104B). In another embodiment, comparator 116 may use various combinations of keywords 114 to determine the status of runways 104 (e.g., whether runways 104 are open/closed). For example, AMS 102 may monitor airport audio 110 from ground maintenance personnel who may be responsible for opening/closing runways 104 due to events 112.

If a conflict is detected (e.g., if AMS 102 determines that airport audio 110 includes an indication that aircraft 108 has been cleared to use closed runway 104B with ongoing event 112), notification engine 118 may notify/signal ATCT 106 of the conflict. For example, notification engine 118 may provide visual, audio, or kinesthetic alerts to one or more tower controllers. Upon receiving an alert, a tower controller may redirect aircraft 108 to land, takeoff, or otherwise use a different runway 104, and/or may clear the alert. Or, for example, tower controller may determine that the status of runway 104 has not been updated in AMS 102, that no conflict exists, and clear the alert or warning, and change the runway 104 status.

In an embodiment, if ATCT 106 takes no action in response to a warning or signal, a notification engine 118 may signal or notify additional personnel or send a subsequent and/or higher priority alert. For example, if an alert has not been cleared within 30 seconds, notification engine 118 may send another alert signal to an ATC manager.

In an embodiment, notification engine 118, may notify aircraft 108. For example, AMS 102 may receive an indication of which aircraft 108 ATCT 106 is communicating. For example, comparator 116 may determine aircraft 108 from airport audio 110. Or, for example, AMS 102 may receive an indication with airport audio 110 as to which parties are communicating with one another. Then, for example, if a conflict is detected, notification engine 118 may notify one or more of the parties of the conflict. Or, for example, notification engine 118 may only notify aircraft 108 if an alert is not cleared by ACT 108 within a given time period.

An air traffic control safety system for preventing operations on closed airport runways by monitoring controller-pilot voice communications and detecting a correspondence between an existing runway closure and a runway that has been used in an aircraft clearance from the air traffic control tower is provided in system 100. System 100 utilizes automatic speech recognition technology to identify keywords in the voice communications and determines the need for an alert based on the presence or absence of keywords and the location of the keywords relative to one another. Furthermore, system 100 may also, include a user interface for specifying runway closure and for notifying airport, air traffic control and flight deck personnel of the conflict between the runway closure and the clearance.

Figure 2:
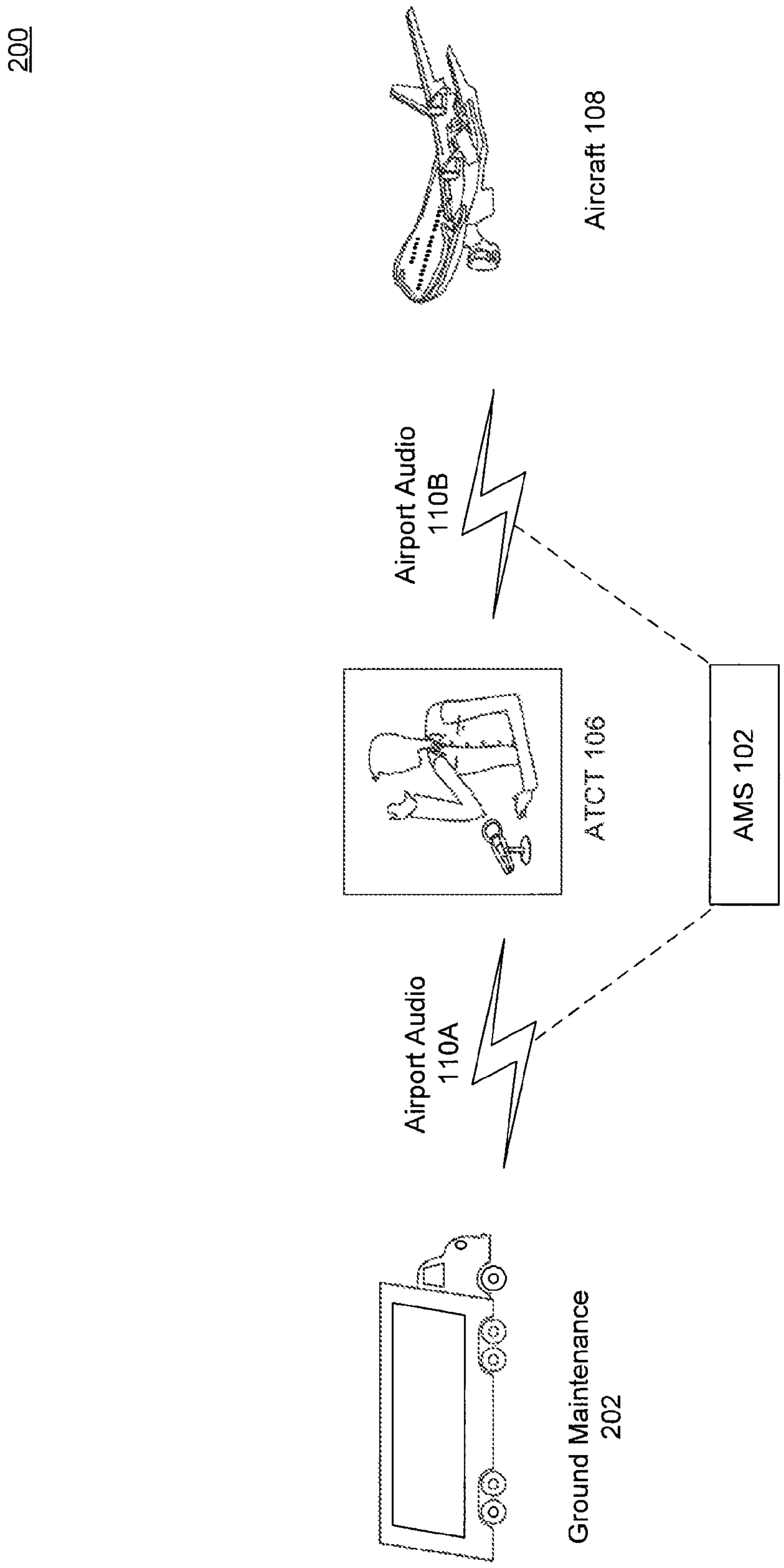
FIG. 2 is a block diagram of a system that monitors audio for event-conflicts and signals when an event-conflict is detected, according to another example embodiment.

FIG. 2 is a block diagram 200 of a system that monitors audio for event-conflicts and signals when an event-conflict is detected, according to an example embodiment. AMS 102 may monitor airport audio 110A and 110B to determine when events 112 have occurred, determine whether events 112 are completed, and determine if a conflict is occurring.

AMS 102 may monitor airport audio 110A to determine the status of runways 104. Airport audio 110A may include any airport communications, including audio, pager, or other system communications, through which the status of runways 104 may be determined. For example, in normal airport operations, ground maintenance 202 may be responsible for informing the ATCT of whether a runway 104 should be opened or closed. Ground maintenance 202 may also be responsible for informing ATCT 106 of the status of various runways 104. For example, ground maintenance 202 may inspect runways 104A and 104B, and determine there is a condition that may make runway 104B unsafe to use. Ground maintenance 202 may then inform ATCT 106 of the situation, and ATCT may then close runway 104B. The status may be provided via audio communication and/or by updating an existing airport system. AMS 102 may passively or actively monitor these communications and/or systems to determine the status of runways 104. For example, using a selection or various combinations of runway status keywords 114, comparator 116 may determine the status of the various airport runways 104.

In an embodiment, ground maintenance 202 and/or ATCT 106 personnel may be responsible for directly inputting the status of runways 102 to AMS 102. When the status of a runway 104 needs to be determined, AMS 102 may then notify or query one of ATCT 106 or ground maintenance 202.

As discussed above, AMS 102 may also monitor airport audio 110B. Airport audio 110B may include any communications between ATCT 106 and the flight deck of aircraft 108. AMS 102 may monitor airport audio 110B to determine if a conflict has occurred between runway events 112 and use of a closed runway 10413. For example, AMS 102 may monitor airport audio 110B to determine if aircraft 108 has been cleared to land/takeoff, or otherwise use closed runway 104B. When a conflict is detected, as discussed above, AMS 102 may notify any party including, ground maintenance, ATCT 106, or aircraft 108.

Figure 3:
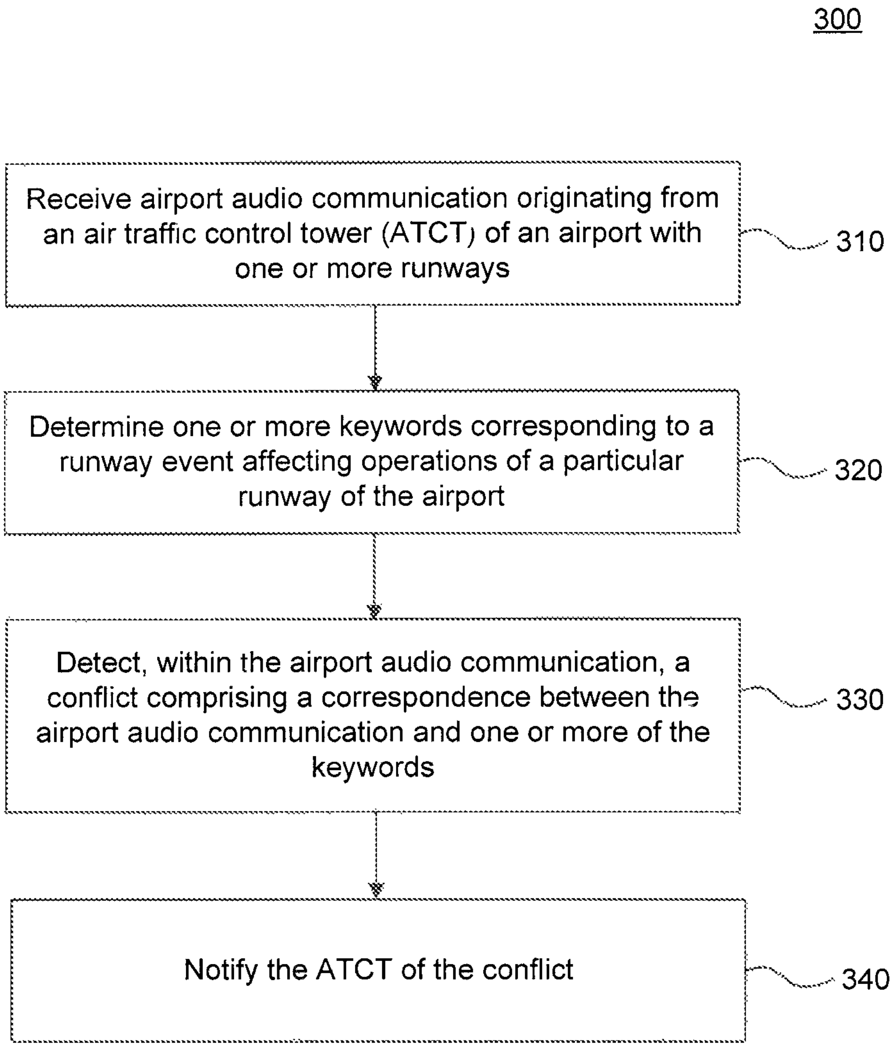
FIG. 3 is a flowchart illustrating a process for monitoring audio for event-conflicts and signaling when an event-conflict is detected, according to an example embodiment.

FIG. 3 is a flowchart illustrating a process 300 for monitoring audio for event-conflicts and signaling when an event-conflict is detected, according to an example embodiment.

At stage 310, airport audio communication originating from an airport traffic control tower (ATCT) of an airport with one or more runways is received. For example, AMS 102 may monitor airport audio 110. In an embodiment, AMS 102 may be a standalone system within ATCT 106 that listens to outgoing/incoming audio from tower controllers in the ATCT 106. In another embodiment, AMS 102 may monitor any existing runway status systems of an airport.

AMS 102 may either passively or actively monitor airport audio 110. During passive monitoring, AMS 102 may not query or prompt ATCT 106 or other personnel for confirmation of conflicts or runway statuses, but instead may work in the background and only send a signal when a conflict is detected. During active monitoring, AMS 102 may query personnel when airport audio 110 or runway statuses are unclear.

At stage 320, one or more keywords corresponding to a runway event affecting operations of a particular runway of the airport are determined. For example, AMS 102 may include a database or algorithms for various events 112 and runway statuses. Then for example, upon receiving an event 112 indication or status update (e.g., runway 104B is closed), AMS 102 may monitor airport audio 110 for any keywords 114 corresponding to the event 112.

At stage 330, within the airport audio communication, a conflict is detected. For example, comparator 116 may compare airport audio 110 against keywords 114 to determine if any conflicts exist between what was said, or detected to be said, by tower controllers and the existing status of runways 104 regarding ongoing events 112. It for example, certain keywords 114 are detected, or if particular combinations of keywords 114 are detected within airport audio 114, a conflict may be detected.

At stage 340, the tower controller is notified of the conflict. For example, notification engine 118 may send an audio and/or visual signal to ATCT 106 that a tower controller has cleared aircraft 108 to use a closed runway 104B. In an embodiment, notification engine 118 may also recommend a list of one or more runways 104 that are open or available, or provide other status information as to when a runway 104 is expected to reopen. In an embodiment, ATCT 106 may also query AMS 102 for runway status information, or status information may be displayed on a monitor in ATCT 106. AMS 102 may monitor airport audio 110A to detect clearances that can be used to predict and model aircraft trajectories and other aircraft state information. AMS 102 may provide trajectory and other aircraft state information to an air traffic control automation system to support other air traffic management automation functions, such as safety, capacity optimization, delay reduction and logging.

Example Computer System

Figure 4:
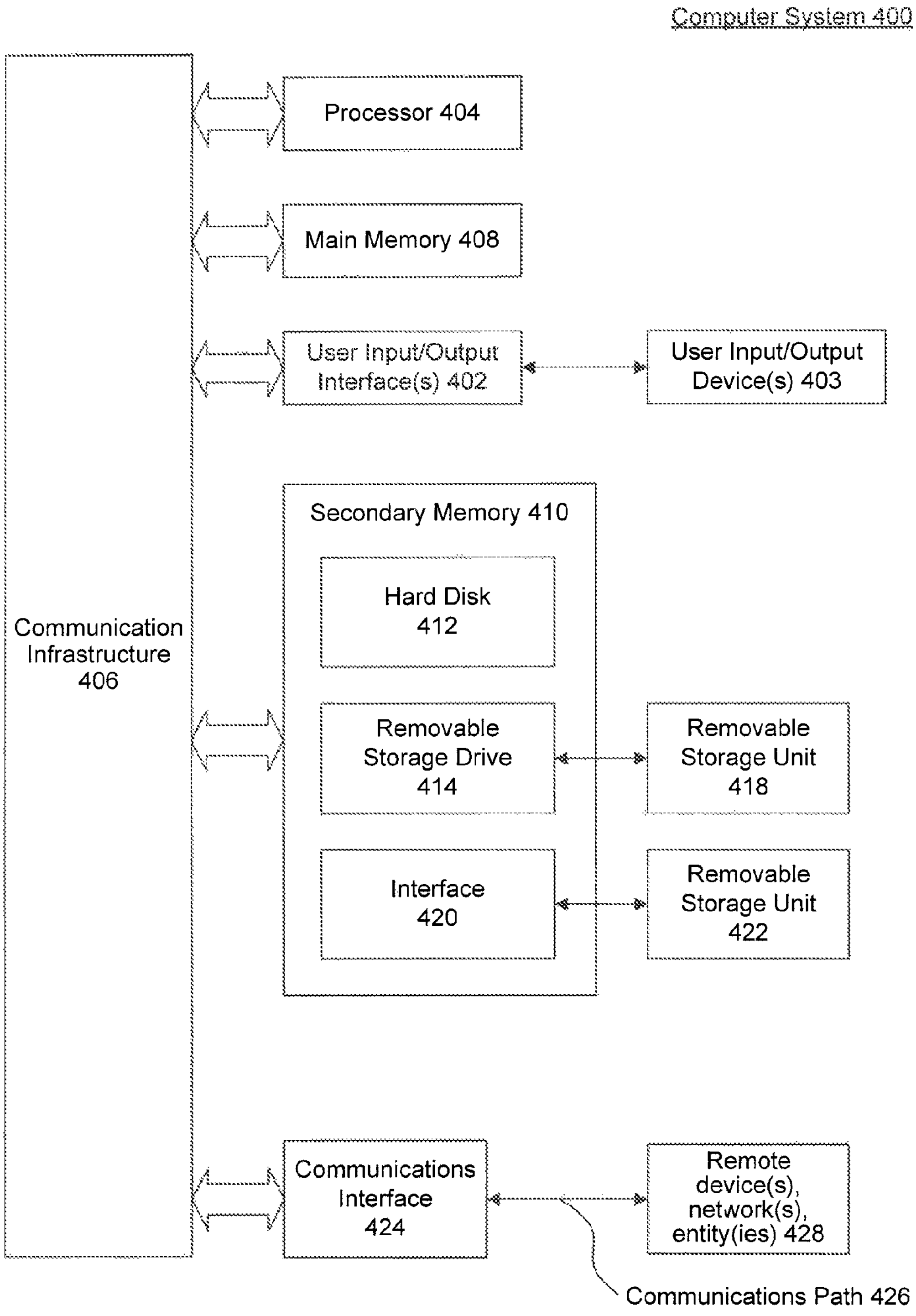
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

One or more processors 404 may each be a graphics-processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method comprising:

receiving airport audio communication originating from one of an air traffic control tower (ATCT) of an airport with one or more runways or a flight deck of an aircraft;

determining one or more keywords corresponding to a runway event affecting operations of a particular runway of the airport;

detecting, within the airport audio communication, a conflict comprising a correspondence between the airport audio communication and one or more of the keywords, wherein the conflict indicates that an aircraft has been cleared to use the particular runway associated with the runway event; and notifying the ATCT of the conflict.

2. The method of claim 1, wherein the airport audio communication is between the ATCT and the flight deck of the aircraft either landing at or taking off from the airport.

3. The method of claim 2, wherein the notifying comprises notifying an air traffic controller of the ATCT of the conflict.

4. The method of claim 1, wherein the detecting comprises:

detecting the conflict based on a detection of a combination of two or more keywords within a specified time interval or word interval.

5. The method of claim 4, wherein the keywords include an identification of the particular runway affected by the event.

6. The method of claim 5, wherein the keywords include keywords associated with the ATCT clearing an aircraft to use the particular runway affected by the event.

7. The method of claim 1, wherein the runway event includes a closure of use of the particular runway.

8. The method of claim 1, wherein the notification comprises at least one of a visual, audio, kinesthetic, or other notification.

9. A system, comprising:

a memory; and at least one processor coupled to the memory and configured to:

receive airport audio communication originating from one of an air traffic control tower (ATCT) of an airport with one or more runways or a flight deck of an aircraft;

determine one or more keywords corresponding to a runway event affecting operations of a particular runway of the airport;

detect, within the airport audio communication, a conflict comprising a correspondence between the airport audio communication and one or more of the keywords, wherein the conflict indicates that an aircraft has been cleared to use the particular runway associated with the runway event; and notify the ATCT of the conflict.

10. The system of claim 9, wherein the airport audio communication is between an air traffic controller of the ATCT and a flight deck of an aircraft either landing at or taking off from the airport.

11. The system of claim 10, wherein the notifying comprises notifying one of the ATCT or the flight deck of the conflict.

12. The system of claim 9, wherein at least one processor configured to detect is further configured to:

detect the conflict based on a detection of a combination two or more keywords within a specified time interval or word interval.

13. The system of claim 12, wherein the keywords include an identification of the particular runway affected by the event.

14. The system of claim 13, wherein the keywords include keywords associated with the an air traffic controller of the ATCT clearing an aircraft to use the particular runway affected by the event.

15. The system of claim 9, wherein the runway event includes a closure of use of the particular runway.

16. The system of claim 9, wherein the notification comprises at least one of a visual, audio, kinesthetic or other notification.

17. A tangible computer-readable device having instructions stored thereon that, when executed by at least one computing device, causes the at least one computing device to perform operations comprising:

receiving airport audio communication originating from one of an air traffic control tower (ATCT) of an airport with one or more runways or a flight deck of an aircraft;

determine one or more keywords corresponding to a runway event affecting operations of a particular runway of the airport;

detecting, within the airport audio communication, a conflict comprising a correspondence between the airport audio communication and one or more of the keywords, wherein the conflict indicates that an aircraft has been cleared to use the particular runway associated with the runway event; and notifying the ATCT of the conflict.

18. The computer-readable device of claim 17, wherein the airport audio communication is between an air traffic controller of the ATCT and a flight deck of an aircraft either landing at or taking off from the airport.

19. The computer-readable device of claim 18, wherein the notifying comprises notifying the ATCT of the conflict.

20. The computer-readable device of claim 17, the detecting operations further comprising: detecting the conflict based on a detection of a combination two or more keywords within a specified time interval or word interval.

21. The method of claim 1, wherein the airport audio communication comprises two-way communication.

* * * * *